Jan. 16, 1934. G. E. WALKER ET AL 1,944,048
PROCESS OF PURIFYING PHOSPHATES
Filed Aug. 8, 1932
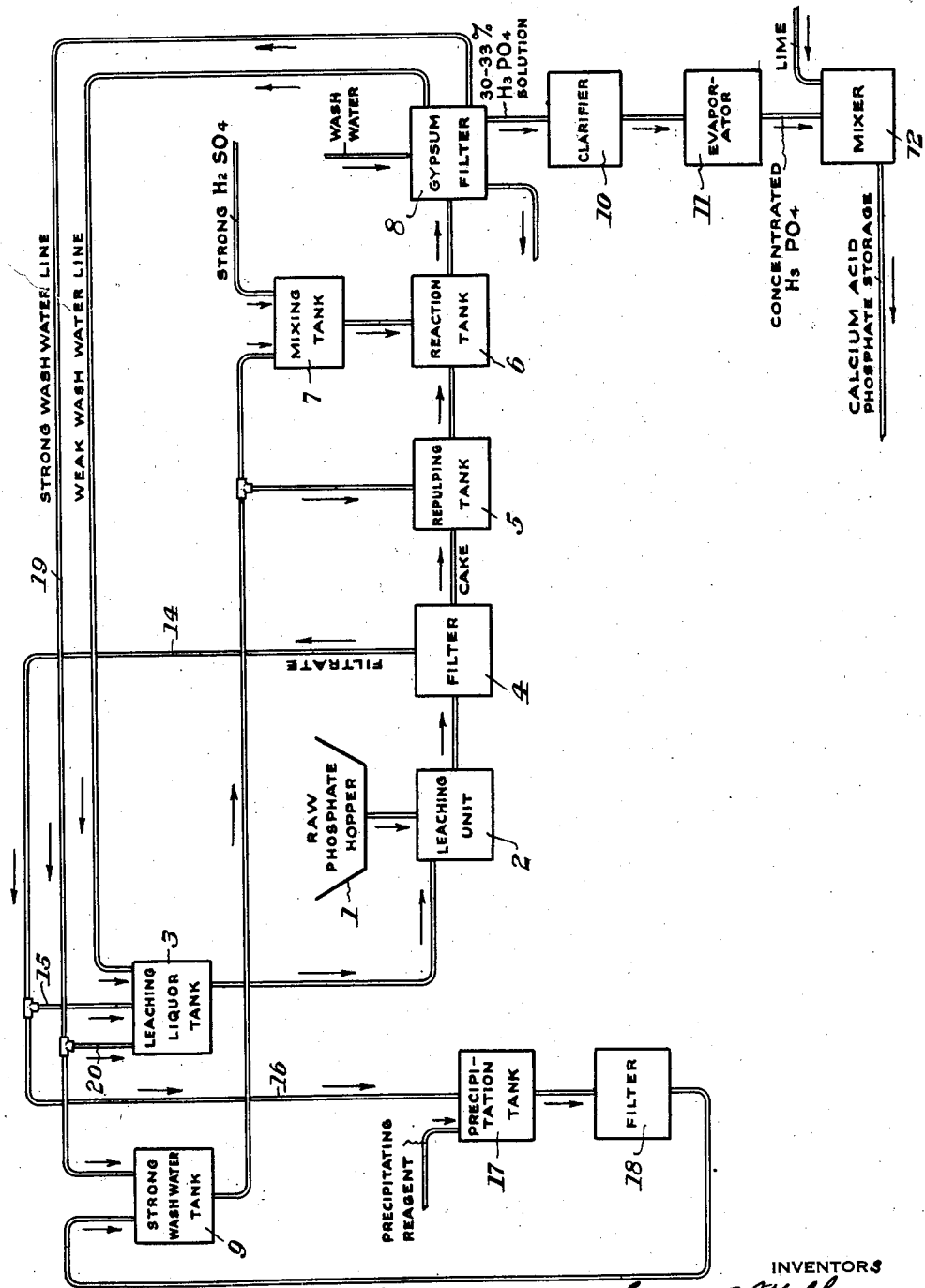
INVENTORS
George E. Walker
Albert E. Marshall
Holbert Earl Dunn
by their attorneys
Byrnes, Stebbins, Parmelee & Blenko Patented Jan. 16, 1934

1,944,048

UNITED STATES PATENT OFFICE 1,944,048

PROCESS OF PURIFYING PHOSPHATES

George E. Walker, Amherst, Va., and Albert E. Marshall, Scarsdale, N. Y., and Holbert Earl Dunn, Crafton, Pa., assignors to Southern Mineral Products Corporation, New York, N. Y., a corporation of Delaware Application August 8, 1932. Serial No. 627,935

8 Claims. (Cl. 23—165)

The present invention relates to a process of purifying phosphates, and more especially to a process of purifying raw calcium phosphates containing iron, aluminum, silicon and/or fluorine compounds, as impurities. The process may be utilized to remove the greater part or substantially all of these impurities, and to produce a purified phosphoric acid.

By "raw phosphates" we mean to include the various raw materials used in the manufacture of phosphoric acid or refined phosphates, such, for example, as apatite, phosphate rock, and various other phosphatic minerals and materials. These raw phosphates consist principally of calcium phosphate containing various impurities usually including iron, aluminum, silicon and fluorine compounds.

In the usual hydrolytic process of making phosphoric acid, the raw phosphate material, such as apatite or phosphate rock, is digested with a sulphuric acid solution which breaks down the calcium phosphate, producing insoluble calcium sulphate and a phosphoric acid solution. The calcium sulphate is filtered off and the phosphoric acid solution is employed for the desired purpose, such, for example, as the making of calcium acid phosphate which is one of the usual products of the process.

The raw phosphate materials, such as apatite and phosphate rock, usually contain appreciable amounts of iron, aluminum, silicon and fluorine compounds, frequently in the neighborhood of from 2 to 10% of each. In the usual hydrolytic process these impurities are carried through and contaminate the phosphoric acid and the resultant phosphoric acid products.

The present invention relates particularly to the removal of iron, aluminum, silicon and/or fluorine impurities from the raw phosphate material, and especially to the removal of these impurities in the hydrolytic process of producing phosphoric acid.

Phosphoric acid and phosphates, particularly calcium acid phosphate, are commonly employed in the manufacture of food products. Calcium acid phosphate is one of the ingredients used in baking powder and in the manufacture of self-rising flours. For these purposes, it is particularly important that the iron, aluminum, silicon and fluorine impurities be kept at a minimum, preferably a fraction of a per cent of each.

In accordance with our process the impure raw phosphate material, which is usually calcium phosphate, is ground and leached with a relatively weak solution containing phosphoric acid. The weak phosphoric acid solution serves selectively to dissolve the iron and aluminum compounds in the impure calcium phosphate, exerting a relatively greater dissolving action upon the iron and aluminum impurities than upon the calcium phosphate itself. In this way, the iron and aluminum impurities are first removed from the raw phosphate, which may then be put through the usual hydrolytic treatment with sulphuric acid to produce phosphoric acid, which, because of the preliminary purifying treatment, has a very low content of the iron and aluminum impurities.

The usual iron and aluminum impurities are of a complex nature and the content of the iron-aluminum impurities is usually expressed as $R_2O_3$, the "R" indicating the combined iron and aluminum which is expressed as the oxide.

The drawing illustrates diagrammatically a flow sheet showing the preferred application of the process to the hydrolytic production of phosphoric acid from raw phosphate material.

Referring to the process as outlined in the flow sheet:—The impure phosphate material containing the iron and aluminum impurities, such, for example, as apatite, or phosphate rock, is first finely ground and supplied to a hopper 1, from which it passes into a leaching unit 2. In the leaching unit the ground phosphate is leached, preferably by thorough agitation with a relatively weak leaching solution containing phosphoric acid. In the illustrated process this weak leaching liquor consists principally of the weak wash water from the usual gypsum filter of the hydrolytic process. This weak wash water usually contains from 5 to 15 per cent of phosphoric acid ($H_3PO_4$) together with small amounts of the usual impurities and contaminations present in technical phosphoric acid as obtained in the hydrolytic process. The weak wash water usually contains a small amount of sulphuric acid, together with traces of fluorine compounds in the case of most apatites.

We prefer to adjust the sulphuric acid in the reaction tanks such that a small amount, preferably under 0.25% free $H_2SO_4$ comes back with the weak wash water, with benefit to leaching by opening up the ore, and liberating traces of hydrofluoric acid which in turn assists the leaching. The weak wash water leaching liquor is preferably preheated to 150° F. to further increase its leaching efficiency.

This relatively dilute leaching liquor containing the phosphoric acid, selectively dissolves out the iron and aluminum impurities, that is to say, it dissolves out a relatively large percentage of the iron-aluminum impurities while dissolving but a relatively small percentage of the calcium phosphate. The iron and aluminum impurities are believed to be dissolved as iron phosphate and aluminum phosphate, which are soluble in the hot acid leaching liquor. Usually over two-thirds of the iron-aluminum impurities can be readily dissolved in commercial plant operation, utilizing the usual available amount of weak wash water from the gypsum filter.

The leaching liquor is preferably a dilute solution containing from about 5 to 15% of phosphoric acid, unless the raw material contains additional acid consuming constituents, such as carbonates, than those therein mentioned. There is no particular advantage in utilizing more than about a 15% solution, and there is a decided disadvantage in using solutions of greater concentration in that greater amounts of neutralizing agents are required, as will be hereinafter explained.

The leaching liquor is supplied from a storage tank 3 to the leaching unit 2, as shown on the flow sheet. The slurry from the leaching unit flows to a filter 4 which separates the spent leaching liquor containing the greater part of the iron-aluminum impurities from the undissolved calcium phosphate. The undissolved calcium phosphate cake then goes to a repulping tank 5 where it is repulped with the strong wash water obtained from the gypsum filter. The repulped phosphate then flows to a reaction tank 6 in which it is subjected to the action of a sulphuric acid solution. A portion of the strong wash water is mixed with strong sulphuric acid in a mixing tank 7 and is supplied to the repulped slurry in the reaction tank 7. The slurry and sulphuric acid are thoroughly agitated in the reaction tank until the calcium phosphate is broken down to produce solid calcium sulphate (gypsum) and a solution of phosphoric acid, generally containing about 30 to 33% phosphoric acid. In plant operation the reaction tank operation is frequently carried out in two or three tanks in series.

From the reaction tank the slurry of gypsum and phosphoric acid flows to a gypsum filter 8 in which the gypsum-containing acid insoluble residue is filtered out and preferably utilized as a valuable byproduct. The gypsum cake in the filter is washed with water to remove phosphoric acid which is entrained in the gypsum. The washing is carried out with a limited amount of water. The first wash water, which we have designated as strong wash water, usually contains about 20% phosphoric acid and is piped over to the strong wash water tank 9. The last or weak wash water, which should contain about 5 to 15%, usually about 10%, phosphoric acid, is piped to the leaching liquor tank 3. But it is apparent that the 5 to 15% concentration of the weak wash water can be raised or lowered as required, by the addition of some of the 20% acid strong wash water or by the addition of plain water.

The strong (30 to 33%) phosphoric acid solution may be utilized for any of the usual purposes. It can be utilized as phosphoric acid or it can be used in the preparation of various phosphates. On the flow sheet we have illustrated as a typical example the utilization of phosphoric acid in the making of calcium acid phosphate. In this case the phosphoric acid passes into clarifying apparatus 10 in which arsenic and other deleterious compounds, together with any entrained gypsum, are separated. The clarified solution is then concentrated in an evaporator 11 to about 70 to 75% solution of phosphoric acid which passes to a mixer 12 where it is mixed with a sufficient amount of lime to convert it to calcium acid phosphate.

Having already described the source of the leaching liquor as the weak wash from the gypsum filter 8, we will now more particularly describe the recirculation and regeneration of the leaching liquor in the purification process.

As above explained, the source of the leaching liquor usually containing about 10% phosphoric acid, is from the last washing in the gypsum filter 8, and the leaching liquor is stored in the tank 3. The leaching liquor after passing to the leaching unit 2 and the filter 4, is discharged from the filter through the pipe 14 which has two branches 15 and 16. Usually a portion of the spent liquor may be recirculated into the leaching liquor storage tank 3 through the branch pipe 15. A building up of too great a concentration of the iron and aluminum impurities in the leaching liquor is prevented by diverting the remainder of the liquor flowing from the filter 4 into the branch pipe 16 which discharges into a precipitation tank 17 in which the diverted leaching liquor is treated to precipitate out the iron and aluminum impurities. For this purpose a precipitating reagent is supplied to the precipitation tank in an amount sufficient to effect such precipitation. The precipitating reagent usually employed is an alkaline compound, such as soda ash or caustic soda.

The acidity of the leaching liquor delivered to the precipitating tank 17 and the amount of alkaline precipitating reagent, are so proportioned as to reduce the acidity of the leaching liquor to a point where the iron and aluminum phosphates are precipitated in the precipitation tank. The amount of the soda ash or caustic soda precipitating reagent used is predetermined by the fluorine content of the phosphate raw material and is calculated on this basis. The fluorine content is, as hereinafter described, removed as an insoluble sodium silico fluoride at a later stage of the process. Just sufficient soda ash or caustic soda is added to combine with and remove the fluorine content. An excess of soda beyond this point should be avoided in order to prevent contamination of the phosphoric acid with sodium compounds.

After the amount of soda ash which can be added to the precipitation tank has been calculated on the basis of the fluorine content of the phosphate raw material, the acidity of the leaching solution in the tank 3 is adjusted so that it will be sufficiently neutralized in the precipitating tank 17 to effect the precipitation of the iron and aluminum phosphates. This adjustment is accomplished by either adding some of the 20% acid strong wash water tapped off from the strong wash water line 19 through the tap 20, or by the addition of plain water to the tank 3. The iron and aluminum phosphates which have been rendered insoluble by addition of the alkaline reagent to the tank 17, are removed by the filter 18.

The filtrate or clarified solution which now contains monosodium phosphate and some free phosphoric acid is piped from the filter 18 to the strong wash water tank 9. The leaching liquor from which the iron and aluminum have been removed is thus reintroduced into the system where its soda content combines with the fluorine impurities in the repulping tank 5 and reaction tank 6, to form an insoluble sodium silico fluoride, the silica as well as the fluorine being derived from the phosphate raw material. This insoluble sodium silico fluoride is removed, together with the gypsum on the gypsum filter 8, thus removing the fluorine, silicon and sodium impurities from the phosphoric acid. Any excess silica above that required to form the sodium silico fluoride is filtered out at the gypsum filter probably as insoluble silicic acid.

While we have specifically described the preferred embodiment of our process, it is to be understood that the process would be otherwise embodied and practiced within the scope of the following claims.

We claim:

1. The process of making phosphoric acid from raw phosphates containing iron and aluminum compounds, which comprises leaching the phosphate with a dilute solution containing from 5 to 15% of phosphoric acid, so as to dissolve out iron or aluminum compounds, and thereafter treating the thus-purified phosphate with sulphuric acid to produce phosphoric acid, precipitating the iron and aluminum compounds from the leaching solution, and utilizing the thus-purified leaching solution in said sulphuric acid treatment.

2. The process of making phosphoric acid from raw phosphates containing iron and aluminum compounds, which comprises leaching the phosphate with a dilute solution containing phosphoric acid so as to selectively dissolve out iron and aluminum constituents, treating the thus-purified phosphate with sulphuric acid to produce a slurry containing gypsum and phosphoric acid, precipitating the iron and aluminum compounds from the spent leaching solution, utilizing the thus-purified leaching solution in said sulphuric acid treatment, filtering the gypsum from the slurry produced in said sulphuric acid treatment, washing the gypsum from entrained phosphoric acid and utilizing a relatively more dilute portion of the wash water for the said leaching solution.

3. The process of making phosphoric acid from raw phosphates containing iron and aluminum compounds, which comprises leaching the phosphate with a dilute solution containing phosphoric acid to remove iron and aluminum compounds, and thereafter treating the thus-purified phosphate with sulphuric acid to produce phosphoric acid, precipitating the iron and aluminum compounds from the leaching solution, and utilizing the thus-purified leaching solution in said sulphuric acid treatment.

4. The process of making phosphoric acid from raw phosphates containing iron and aluminum compounds, which comprises leaching the raw phosphate with a dilute solution of phosphoric acid selectively to dissolve and remove iron and aluminum compounds, treating the thus-purified raw phosphates with sulphuric acid so as to produce a slurry containing gypsum and phosphoric acid, precipitating the iron and aluminum compounds from the spent leaching solution, utilizing the thus-purified leaching solution in said sulphuric acid treatment, filtering the gypsum from the slurry produced in said sulphuric acid treatment, washing the gypsum from entrained phosphoric acid, and utilizing at least a part of the wash water for the said leaching solution.

5. The process of making phosphoric acid from raw phosphates containing iron and aluminum compounds, which comprises leaching the phosphate with a dilute solution containing phosphoric acid so as to dissolve and remove iron and aluminum compounds, treating the thus-purified raw phosphate with sulphuric acid to produce a slurry containing gypsum and phosphoric acid, filtering the gypsum from the phosphoric acid and washing the gypsum cake from entrained phosphoric acid, utilizing the strong wash water liquor from the gypsum filter in the sulphuric acid treatment, utilizing the weak wash water liquor from the gypsum filter as said dilute leaching solution, treating the spent leaching solution containing the iron and aluminum compounds to precipitate and separate such compounds therefrom, and utilizing the thus-purified weak leaching solution in the sulphuric acid treatment.

6. The process of making phosphoric acid from raw phosphates containing iron, aluminum, fluorine and silicon impurities, which comprises leaching the raw phosphate with a dilute solution of phosphoric acid selectively to dissolve and remove iron and aluminum compounds, treating the spent leaching liquor with an alkaline sodium compound to precipitate iron and aluminum compounds therefrom, clarifying the leaching liquor from the precipitated iron and aluminum compounds, treating the thus-purified raw phosphates with sulphuric acid together with the clarified leaching liquor so as to produce a slurry containing phosphoric acid, gypsum and an insoluble sodium silico fluoride, and filtering the gypsum and insoluble sodium silico fluoride from the phosphoric acid.

7. The process of making phosphoric acid from raw phosphates containing iron, aluminum, fluorine and silicon impurities, which comprises leaching the raw phosphate with a dilute solution of phosphoric acid selectively to dissolve and remove iron and aluminum compounds, treating the spent leaching liquor with an alkaline sodium compound to precipitate iron and aluminum compounds therefrom, clarifying the leaching liquor from the precipitated iron and aluminum compounds, treating the thus-purified raw phosphates with sulphuric acid together with the clarified leaching liquor so as to produce a slurry containing phosphoric acid, gypsum and an insoluble sodium silico fluoride, filtering the gypsum and insoluble sodium silico fluoride from the phosphoric acid, washing the gypsum from entrained phosphoric acid, and utilizing at least a part of the wash water liquor for the said leaching solution.

8. The process of making phosphoric acid from raw phosphates containing iron, aluminum, fluorine and silicon impurities, which comprises selectively dissolving out iron and aluminum compounds, treating the thus-purified raw phosphates with sulphuric acid together with an amount of sodium compound calculated on the basis of the fluorine content of the raw phosphates so as to produce a slurry containing phosphoric acid, gypsum and an insoluble sodium silico fluoride, and filtering the gypsum and insoluble sodium silico fluoride from the phosphoric acid.

GEORGE E. WALKER.
ALBERT E. MARSHALL.
HOLBERT EARL DUNN.